United States Patent
Otsuki et al.

(10) Patent No.: US 11,889,329 B2
(45) Date of Patent: Jan. 30, 2024

(54) RADIO PERFORMANCE MEASUREMENT SYSTEM, RADIO PERFORMANCE MEASUREMENT METHOD, RADIO PERFORMANCE MEASUREMENT DEVICE, AND RADIO PERFORMANCE MEASUREMENT PROGRAM

(71) Applicant: NIPPON TELEGRAPH AND TELEPHONE CORPORATION, Tokyo (JP)

(72) Inventors: Shinya Otsuki, Musashino (JP); Tomoaki Ogawa, Musashino (JP); Makoto Umeuchi, Musashino (JP); Junichi Iwatani, Musashino (JP); Hiroshi Sakamoto, Musashino (JP); Masayoshi Nabeshima, Musashino (JP); Hiroyuki Nakamura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 485 days.

(21) Appl. No.: 17/277,083

(22) PCT Filed: Sep. 13, 2019

(86) PCT No.: PCT/JP2019/036094
§ 371 (c)(1),
(2) Date: Mar. 17, 2021

(87) PCT Pub. No.: WO2020/059655
PCT Pub. Date: Mar. 26, 2020

(65) Prior Publication Data
US 2021/0368364 A1 Nov. 25, 2021

(30) Foreign Application Priority Data
Sep. 20, 2018 (JP) .................................. 2018-176642

(51) Int. Cl.
*H04W 24/04* (2009.01)
*H04W 24/10* (2009.01)
*H04W 84/12* (2009.01)

(52) U.S. Cl.
CPC ........... *H04W 24/04* (2013.01); *H04W 24/10* (2013.01); *H04W 84/12* (2013.01)

(58) Field of Classification Search
CPC ..... H04W 24/04; H04W 24/10; H04W 84/12; H04W 24/02; H04B 17/309
See application file for complete search history.

(56) References Cited

U.S. PATENT DOCUMENTS

2018/0242220 A1* 8/2018 Venkatraman ........ H04W 48/02
2020/0275289 A1* 8/2020 Thangarasa ............ H04B 17/24

FOREIGN PATENT DOCUMENTS

JP 201055136 A 3/2010

OTHER PUBLICATIONS

Masato Uchida et al., Proposal of Instantaneous Throughput Based On Wireless LAN Packet Transmission Duration Considering Idle Time, The 79th National Convention of the Institute of Electronics, Information and Communication Engineers, 2017.

* cited by examiner

*Primary Examiner* — Hashim S Bhatti
(74) *Attorney, Agent, or Firm* — Harness, Dickey & Pierce, P.L.C.

(57) ABSTRACT

A wireless base station and a first wireless terminal include means for collecting first wireless performance information regarding wireless communication in both a downstream direction and an upstream direction and transmitting the first wireless performance information to a wireless performance measurement device. The wireless base station and a second wireless terminal include means for collecting second wireless performance information regarding wireless communication in both the downstream direction and the upstream direction and transmitting the second wireless performance information to the wireless performance measurement device. The wireless performance measurement device includes means for obtaining a first comparison result by comparing the first wireless performance information regarding the upstream direction and the downstream direction, obtaining a second comparison result by comparing the second wireless performance information regarding the upstream direction and the downstream direction, and determining the location where an abnormality occurred in accordance with a result of a comparison of the first comparison (Continued)

result and the second comparison result. The location is determined from among the wireless base station, the first wireless terminal, the second wireless terminal, and a wireless propagation environment between the wireless base station and the first wireless terminal and between the wireless base station and the second wireless terminal.

8 Claims, 5 Drawing Sheets

Fig. 2
(1) AP 10 CONFIGURATION EXAMPLE
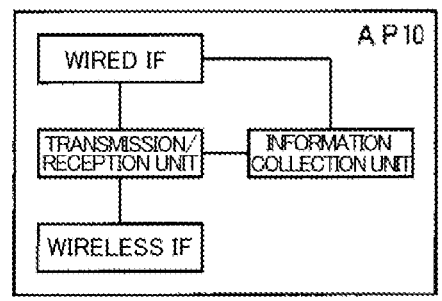
(2) STA 21,22 CONFIGURATION EXAMPLE
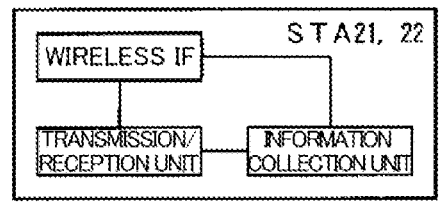
(3) WIRELESS PERFORMANCE MEASUREMENT DEVICE 30 CONFIGURATION EXAMPLE
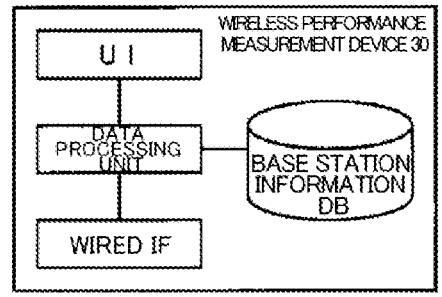

Fig. 4

|  | $S_{ap1} - S_{sta1} > \alpha$ | $|S_{ap1} - S_{sta1}| \leq \alpha$ | $S_{sta1} - S_{ap1} > \alpha$ |
|---|---|---|---|
| $S_{ap2} - S_{sta2} > \alpha$ | (1) FAILURE AT AP TRANSMITTER | (2) FAILURE AT STA 22 RECEIVER | (3) INVESTIGATE USING THIRD STA |
| $|S_{ap2} - S_{sta2}| \leq \alpha$ | (4) FAILURE AT STA 21 RECEIVER | (5) ABNORMALITY IN WIRELESS PROPAGATION ENVIRONMENT | (6) FAILURE AT STA 21 TRANSMITTER |
| $S_{sta2} - S_{ap2} > \alpha$ | (7) INVESTIGATE USING THIRD STA | (8) FAILURE AT STA 22 TRANSMITTER | (9) FAILURE AT AP RECEIVER |

RADIO PERFORMANCE MEASUREMENT SYSTEM, RADIO PERFORMANCE MEASUREMENT METHOD, RADIO PERFORMANCE MEASUREMENT DEVICE, AND RADIO PERFORMANCE MEASUREMENT PROGRAM

CROSS-REFERENCE TO RELATED APPLICATIONS

This application is a 371 U.S. National Phase of International Application No. PCT/JP2019/036094 filed on Sep. 13, 2019, which claims priority to Japanese Application No. 2018-176642 filed on Sep. 20, 2018. The entire disclosures of the above applications are incorporated herein by reference.

TECHNICAL FIELD

The present invention relates to a wireless performance measurement system that is used in a wireless communication system in which a wireless base station (AP) and one or more wireless terminals (STAs) perform wireless communication with each other, the wireless performance measurement system being for determining whether an abnormality has occurred at the AP, at the STA, or in the wireless propagation environment between the AP and the STA based on wireless performance information regarding the upstream direction from the STA to the AP and wireless performance information regarding the downstream direction from the AP to the STA. The present invention also relates to a wireless performance measurement method, a wireless performance measurement device, and a wireless performance measurement program for the same.

BACKGROUND ART

FIG. 5 shows an example of the configuration of a wireless communication system. A wireless LAN system is envisioned here.

In FIG. 5, a wireless base station (AP) 10 and a wireless terminal (STA) 20 are connected via a wireless LAN. A server 100 that is connected to the AP 10 via a network uses a tool such as Iperf to measure the wireless performance (e.g., throughput) in the upstream direction from the STA 20 to the AP 10 and the wireless performance in the downstream direction from the AP 10 to the STA 20, and estimate a cause of a failure to obtain a desired characteristic (NPL 1).

CITATION LIST

Non Patent Literature

[NPL 1] "*Mutûsinzikan wo Kouryosita Musen LAN Paketto Densou Zikan ni Motozuku Surûputto no Teian* (Proposal of Throughput Based on Wireless LAN Packet Transmission Duration Considering Idle Time)", The Japan Society of Information and Communication Research, 79th National Conference, 1T-04.

SUMMARY OF THE INVENTION

Technical Problem

In the method in NPL 1, using Iperf, packets are transmitted from the STA 20, which is connected to the wireless LAN, to the server 100 via the AP 10 in order to measure the throughput in the upstream direction from the STA 20 to the AP 10, and with such a method that uses Iperf, it is also possible to measure the throughput in the downstream direction from the AP 10 to the STA 20.

Here, in the case of a wireless communication system such as a wireless LAN system in which the same frequency is used for the upstream direction and the downstream direction, and the difference between the transmission duration in the respective directions is set in units of milliseconds, the wireless propagation environment (communication quality) can be deemed to be the same in the upstream direction and the downstream direction. Accordingly, in such a situation, the throughput is expected to be the same in the upstream direction and the downstream direction.

However, if there is a difference in throughput between the upstream direction and the downstream direction in the measurement result, it is not possible to determine whether the cause of the difference is in the AP 10, in the STA 20, or in the wireless propagation environment between the AP 10 and the STA 20. However, when the user of the STA 20 reports a problem to the customer support service of the public wireless LAN operator, it is necessary to determine whether the fault is on the AP side or on the user STA side.

An object of the present invention is to provide a wireless performance measurement system that can compare wireless performance information in the upstream direction and the downstream direction between a wireless base station and a wireless terminal and specify whether an abnormality has occurred at the wireless base station, at the wireless terminal, or in the wireless propagation environment, as well as a wireless performance measurement method, a wireless performance measurement device, and a wireless performance measurement program for the same.

Means for Solving the Problem

A first invention is a wireless performance measurement system including a wireless performance measurement device that is to be connected to a wireless base station that performs wireless communication with two or more wireless terminals including a first wireless terminal and a second wireless terminal, the wireless base station and the first wireless terminal including means for collecting first wireless performance information regarding wireless communication in a downstream direction and first wireless performance information regarding wireless communication in an upstream direction and transmitting the first wireless performance information to the wireless performance measurement device, the downstream direction being a direction from the wireless base station to the first wireless terminal and the second wireless terminal, and the upstream direction being a direction from the first wireless terminal and the second wireless terminal to the wireless base station, the wireless base station and the second wireless terminal including means for collecting second wireless performance information regarding wireless communication in the downstream direction and second wireless performance information regarding wireless communication in the upstream direction and transmitting the second wireless performance information to the wireless performance measurement device, and the wireless performance measurement device including means for obtaining a first comparison result by comparing the first wireless performance information regarding the upstream direction and the downstream direction, obtaining a second comparison result by comparing the second wireless performance information regarding the upstream direction and the downstream direction, comparing the first comparison result and the second comparison result, and determining a location where an abnormality occurred in accordance with a result of the comparison of the first comparison result and the second comparison result, the location being determined from among the wireless base station, the first wireless terminal, the second wireless terminal, and a wireless propagation environment between the wireless base station and the first wireless terminal and between the wireless base station and the second wireless terminal.

In the wireless performance measurement system according to the first invention, if the first comparison result and the second comparison result indicate a failure at the first wireless terminal and the second wireless terminal, the wireless performance measurement device may determine that a failure occurred at a transmitter of the wireless base station, and if the first comparison result and the second comparison result both indicate a failure at the wireless base station, the wireless performance measurement device may determine that a failure occurred at a receiver of the wireless base station.

In the wireless performance measurement system according to the first invention, if the first comparison result and the second comparison result indicate a failure at the first wireless terminal or the second wireless terminal, the wireless performance measurement device may determine that a failure occurred at a receiver of the corresponding wireless terminal, and if only either the first comparison result or the second comparison result indicates a failure at the wireless base station, the wireless performance measurement device may determine that a failure occurred at a transmitter of the corresponding wireless terminal.

In the wireless performance measurement system according to the first invention, if a communication abnormality occurs in a case where the first comparison result and the second comparison result indicate that the first wireless terminal and the second wireless terminal are normal and also indicate that the wireless base station is normal, the wireless performance measurement device may determine that the abnormality occurred in the wireless propagation environment.

In the wireless performance measurement system according to the first invention, if the first comparison result indicates a failure at the wireless base station and the second comparison result indicates a failure at the second wireless terminal, or if the first comparison result indicates a failure at the first wireless terminal and the second comparison result indicates a failure at the wireless base station, the wireless performance measurement device may obtain a third comparison result of a comparison of third wireless performance information regarding the upstream direction and the downstream direction collected by a third wireless terminal instead of the first wireless terminal or the second wireless terminal, and determine a failure location in accordance with a result of a comparison with the third comparison result.

A second invention is a wireless performance measurement method of a wireless performance measurement device that is to be connected to a wireless base station in a wireless communication system in which the wireless base station performs wireless communication with two or more wireless terminals including a first wireless terminal and a second wireless terminal, the wireless performance measurement method including: a first step of the wireless base station and the first wireless terminal collecting first wireless performance information regarding wireless communication in a downstream direction and first wireless performance information regarding wireless communication in an upstream direction and transmitting the first wireless performance information to the wireless performance measurement device, the downstream direction being a direction from the wireless base station to the first wireless terminal and the second wireless terminal, and the upstream direction being a direction from the first wireless terminal and the second wireless terminal to the wireless base station; a second step of the wireless base station and the second wireless terminal collecting second wireless performance information regarding wireless communication in the downstream direction and second wireless performance information regarding wireless communication in the upstream direction and transmitting the second wireless performance information to the wireless performance measurement device; and a third step of the wireless performance measurement device obtaining a first comparison result by comparing the first wireless performance information regarding the upstream direction and the downstream direction, obtaining a second comparison result by comparing the second wireless performance information regarding the upstream direction and the downstream direction, comparing the first comparison result and the second comparison result, and determining a location where an abnormality occurred in accordance with a result of the comparison of the first comparison result and the second comparison result, the location being determined from among the wireless base station, the first wireless terminal, the second wireless terminal, and a wireless propagation environment between the wireless base station and the first wireless terminal and between the wireless base station and the second wireless terminal.

A third invention is a wireless performance measurement device that is to be connected to a wireless base station in a wireless communication system in which the wireless base station performs wireless communication with two or more wireless terminals including a first wireless terminal and a second wireless terminal, the wireless performance measurement device including: means for receiving first wireless performance information regarding wireless communication in a downstream direction and first wireless performance information regarding wireless communication in an upstream direction, the first wireless performance information being collected by the wireless base station and the first wireless terminal, the downstream direction being a direction from the wireless base station to the first wireless terminal and the second wireless terminal, and the upstream direction being a direction from the first wireless terminal and the second wireless terminal to the wireless base station; means for receiving second wireless performance information regarding wireless communication in the downstream direction and second wireless performance information regarding wireless communication in the upstream direction, the second wireless performance information being collected by the wireless base station and the second wireless terminal; and means for obtaining a first comparison result by comparing the first wireless performance information regarding the upstream direction and the downstream direction, obtaining a second comparison result by comparing the second wireless performance information regarding the upstream direction and the downstream direction, comparing the first comparison result and the second comparison result, and determining a location where an abnormality occurred in accordance with a result of the comparison of the first comparison result and the second comparison result, the location being determined from among the wireless base station, the first wireless terminal, the second wireless terminal, and a wireless propagation environment between the wireless base station and the first wireless terminal and between the wireless base station and the second wireless terminal.

A wireless performance measurement program according to a fourth invention causes a computer to execute the processing executed by the wireless performance measurement device according to the third invention and determine the location where the abnormality occurred.

Effects of the Invention

According to the present invention, by comparing wireless performance information regarding each direction between a wireless base station and two or more wireless terminals, and then comparing the comparison results, it is possible to specify whether an abnormality has occurred at the wireless base station, at a wireless terminal, or in the wireless propagation environment.

BRIEF DESCRIPTION OF DRAWINGS

FIG. 2 is a diagram showing an example of configurations of an AP 10, STAs 21 and 22, and a wireless performance measurement device 30.

FIG. 4 is a diagram showing an example of a determination made in a first comparison/determination method.

DESCRIPTION OF EMBODIMENTS

Figure 1:
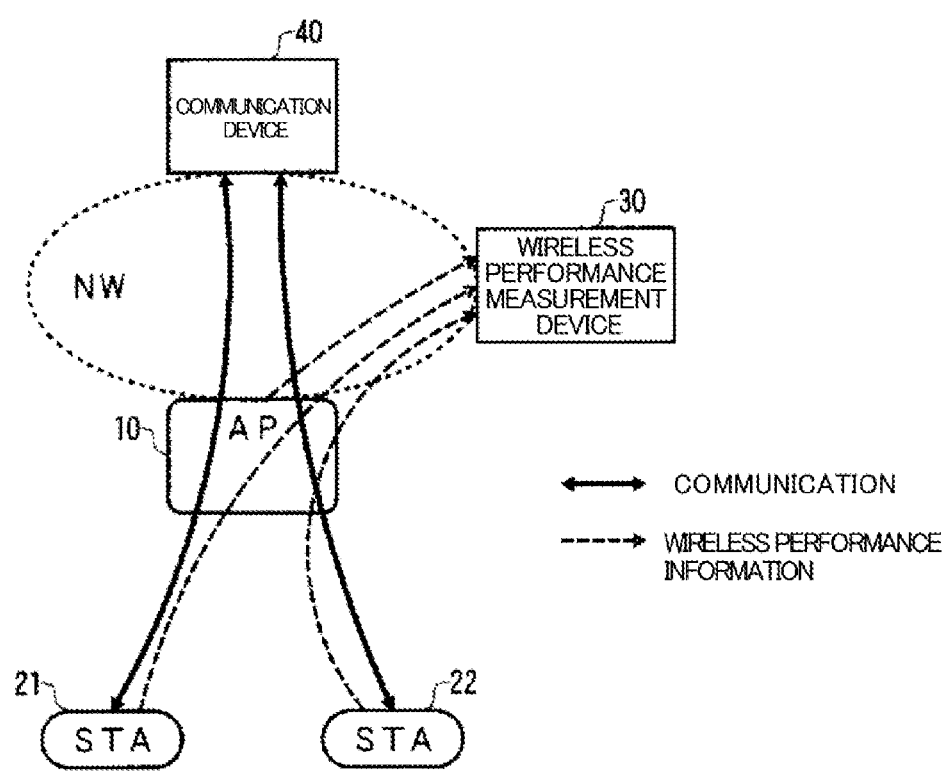
FIG. 1 is a diagram showing an example of a configuration of a wireless performance measurement system according to the present invention.

FIG. 1 is a diagram showing an example of the configuration of a wireless performance measurement system according to the present invention.

In FIG. 1, a wireless base station (AP) 10 and wireless terminals (STAs) 21 and 22 are connected via a wireless LAN. The AP 10 is connected to a wireless performance measurement device (server) 30 and one or more communication devices 40 via a wired or wireless network NW. The STAs 21 and 22 and the communication device 40 communicate with each other via the AP 10 and the network NW. Note that the STAs may communicate with the same communication device 40 or different communication devices 40, and may communicate with other STAs that are connected to the AP 10. Also, the AP 10 and the wireless performance measurement device (server) 30 may be integrated in the same device.

FIG. 2 is a diagram showing an example of the configurations of the AP 10, the STAs 21 and 22, and the wireless performance measurement device (server) 30.

As shown in FIG. 2(1), the AP 10 includes a wireless IF for wireless LAN connection with the follower STAs 21 and 22, a wired IF for wired connection with the wireless performance measurement device 30 or the communication device 40 via the network NW, and a transmission/reception unit and an information collection unit that process signals that the follower STAs 21 and 22 transmit to and receive from the wireless performance measurement device 30 and the communication device 40.

As shown in FIG. 2(2), the STAs 21 and 22 each include a wireless IF for wireless LAN connection with the leader AP 10, and a transmission/reception unit and an information collection unit that process signals that are transmitted to and received from the leader AP 10.

As shown in FIG. 2(3), the wireless performance measurement device 30 includes a wired IF for wired connection with the AP 10 via the network NW, a data processing unit, a base station information database (DB), and a user interface UI.

Figure 3:
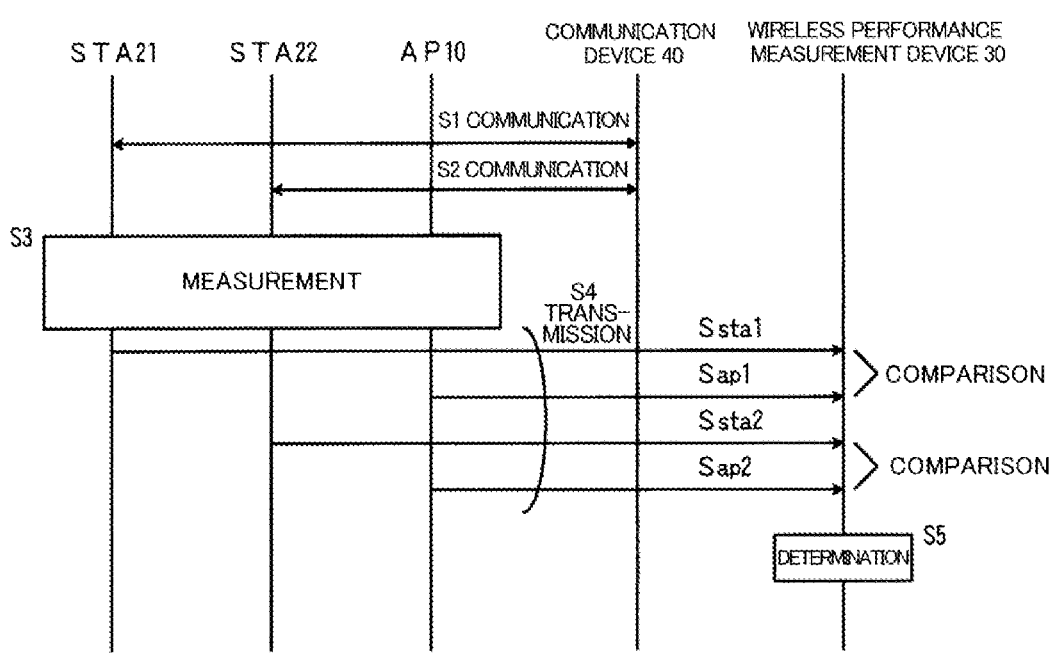
FIG. 3 is a sequence diagram showing an example of a processing procedure of the wireless performance measurement system according to the present invention.
Figure 5:
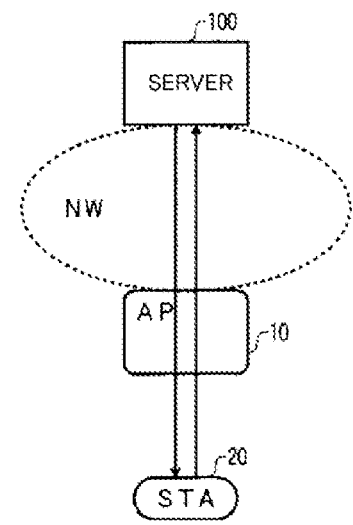
FIG. 5 is a diagram showing an example of a configuration of a wireless communication system.

FIG. 3 is a sequence diagram showing an example of a processing procedure of the wireless performance measurement system according to the present invention.

In FIG. 3, the STAs 21 and 22 and the communication device 40 are communicating with each other via the AP 10 (S1 and S2). At this time, the AP 10 and the STAs 21 and 22 measure their wireless performance during communication at a constant interval (S3), and transmit the measurement results to the wireless performance measurement device 30 as wireless performance information for statistical processing (S4).

Here, the STAs 21 and 22 are not required to communicate with the same communication device 40. Also, the communication between the STAs 21 and 22 and the communication device 40 may be performed in the same time period, or one instance of communication may be started after the end of another instance of communication.

The STAs 21 and 22 and the AP 10 may perform the wireless performance measurement periodically during communication, or the STAs 21 and 22 and the AP 10 may start and end measurement in accordance with instructions that are issued by a user support service when, for example, the user of the STA 21 has reported a problem to the user support service.

The wireless performance measurement device 30 compares wireless performance information Ssta1 with wireless performance information Sap1. The wireless performance information Ssta1 is obtained by integrating wireless performance (e.g., throughput) values for the direction from the AP 10 to the STA 21 (downstream direction), which were measured by the STA 21 on the receiving side and are received by the wireless performance measurement device 30 a certain number of times or in a certain time period. The wireless performance information Sap1 is obtained by integrating wireless performance (e.g., throughput) values for the direction from the STA 21 to the AP 10 (upstream direction), which were measured by the AP 10 on the receiving side and are received by the wireless performance measurement device 30 a certain number of times or in a certain time period. Similarly, the wireless performance measurement device 30 compares wireless performance information Ssta2 from the STA 22 and wireless performance information Sap2 from the AP 10.

Also, the wireless performance in the upstream direction measured by the STAs 21 and 22 on the transmission side and the wireless performance in the downstream direction measured by the AP 10 on the transmission side may be indicated by a transmission parameter such as MCS that is measured a certain number of times or for a certain time period, or may be indicated by a retransmission count, for example.

By comparing the comparison results, the wireless performance measurement device 30 can determine whether a failure occurred at the STA 21 or 22, at the AP 10, or in the wireless propagation environment therebetween.

First comparison/measurement method: determine whether or not the difference between the wireless performance information of the AP 10 and the STA 21 (Sap1−Ssta1, Ssta1−Sap1) or the difference between the wireless performance information of the AP 10 and the STA 22 (Sap2−Ssta2, Ssta2−Sap2) exceeds a given value α.

Second comparison/measurement method: determine whether or not the ratio of the wireless performance information of the AP 10 and the STA 21 (Sap1/Ssta1, Ssta1/Sap1) or the ratio of the wireless performance information of the AP 10 and the STA 22 (Sap2/Ssta2, Ssta2/Sap2) exceeds a given value β.

Third comparison/measurement method: obtain an integral value of the number of times that the difference between the wireless performance information of the AP 10 and the STA 21 (Sap1−Ssta1, Ssta1−Sap1) exceeded the given value α, obtain an integral value of the number of times that the difference between the wireless performance information of the AP 10 and the STA 22 (Sap2−Ssta2, Ssta2−Sap2) exceeded the given value α, and determine whether or not the integral values exceed a given value β.

FIG. 4 is a diagram showing an example of a determination made in the first comparison/determination method. Note that this similarly applies to the second and third comparison/determination methods as well.

In FIG. 4, in the case where Sap1−Ssta1>α, the wireless performance information (throughput) of the STA 21 is lower than that of the AP 10, and the wireless performance measurement device 30 determines that a failure occurred at the STA 21. In the case where Ssta1−Sap1>α, the wireless performance information (throughput) of the AP 10 is lower than that of the STA 21, and the wireless performance measurement device 30 determines that a failure occurred at the AP 10. In the case where |Sap1−Ssta1|≤α, the wireless performance information (throughput) of the AP 10 and the wireless performance information of the STA 21 are comparable with each other, and the wireless performance measurement device 30 determines that both are normal. This similarly applies to the comparison of the wireless performance information of the STA 22 and the AP 10, and the wireless performance measurement device 30 determines the location of a failure in accordance with nine combinations (1) to (9).

(1) Here, "AP 10 normal+STA 21 failure" and "AP 10 normal+STA 22 failure", but because probability that a failure occurred at both of the STAs 21 and 22 is low, the wireless performance measurement device 30 determines that a failure occurred at the transmitter of the AP.

(2) Here, "AP 10 normal+STA 21 normal" and "AP 10 normal+STA 22 failure", and therefore the wireless performance measurement device 30 determines that a failure occurred at the receiver of the STA 22.

(3) Here, "AP 10 failure+STA 21 normal" and "AP 10 normal+STA 22 failure", and therefore the wireless performance measurement device 30 cannot determine the location of the failure. The wireless performance measurement device 30 then collects wireless performance information regarding a third STA for use in failure location determination processing.

(4) Here, "AP 10 normal+STA 21 failure" and "AP 10 normal+STA 22 normal", and therefore the wireless performance measurement device 30 determines that a failure occurred at the receiver of the STA 21.

(5) Here, "AP 10 normal+STA 21 normal" and "AP 10 normal+STA 22 normal", and the AP 10s and the STAs 21 and 22 are all normal, and therefore if an abnormality has occurred in this case, the wireless performance measurement device 30 determines that the abnormality occurred in the wireless propagation environment between the AP 10 and the STA 21 or 22.

(6) Here, "AP 10 failure+STA 21 normal" and "AP 10 normal+STA 22 normal", and therefore the wireless performance measurement device 30 determines that the failure occurred at the transmitter of the STA 21.

(7) Here, "AP 10 normal+STA 21 failure" and "AP 10 failure+STA 22 normal", and therefore the wireless performance measurement device 30 cannot determine the location of the failure. The wireless performance measurement device 30 then collects wireless performance information regarding a third STA for use in failure location determination processing.

(8) Here, "AP 10 normal+STA 21 normal" and "AP 10 failure+STA 22 normal", and therefore the wireless performance measurement device 30 determines that the failure occurred at the transmitter of the STA 22.

(9) Here, "AP 10 failure+STA 21 normal" and "AP 10 failure+STA 22 normal", and therefore the wireless performance measurement device 30 determines that the failure occurred at the receiver of the AP.

The wireless performance information described above is the throughput in the upstream direction measured by the AP on the receiving side and the throughput in the downstream direction measured by the STAs on the receiving side. In a wireless communication system such as a wireless LAN system, the throughput is normally the same in the upstream direction and the downstream direction, but it is possible to determine the location of a failure according to the combinations shown in FIG. 4 by using the difference in throughput between the upstream direction and the downstream direction between the AP and two or more STAs.

Note that in cases (3) and (7), the failure location cannot be determined, and therefore it is necessary for the wireless performance between a third STA and the AP 10 to be measured at a certain interval, and for the wireless performance measurement device 30 to collect such wireless performance information.

Also, in a method that uses throughput as the wireless performance information, an erroneous detection can possibly occur if there is a difference in traffic between the upstream and downstream directions. Here, in the case of using a system such as a wireless LAN system that applies a mechanism for varying the modulation parameter (MCS), the modulation parameter used when the AP performs transmission and the modulation parameter used when the STA performs transmission are expected to be substantially the same. Using the modulation parameter as wireless performance information, the wireless performance measurement device 30 can estimate the failure location according to a difference in the modulation parameter (selection error) between the AP and two or more STAs, using combinations such as those shown in FIG. 4.

Also, a method that uses the modulation parameter as wireless performance information cannot be applied to cases where the AP and an STA have different hardware configurations (e.g., antenna gains or number of antennas used in MIMO). However, when the modulation parameter is selected, control is normally performed such that the retransmission rate is constant. Accordingly, using the retransmission rate as wireless performance information, the wireless performance measurement device 30 can estimate the failure location according to a difference in the retransmission rate between the AP and two or more STAs, using combinations such as those shown in FIG. 4.

The wireless performance measurement device 30 described above can be realized using a computer and a computer program. The computer program can be stored on a computer-readable storage medium, and can also be provided via a network.

REFERENCE SIGNS LIST

10 Wireless base station (AP)
20, 21, 22 Wireless terminal (STA)
30 Wireless performance measurement device
40 Communication device
100 Server

The invention claimed is:

1. A wireless performance measurement system including a wireless performance measurement device that is to be connected to a wireless base station that performs wireless communication with two or more wireless terminals including a first wireless terminal and a second wireless terminal, the wireless base station and the first wireless terminal including means for collecting first wireless performance information regarding wireless communication in a downstream direction and first wireless performance information regarding wireless communication in an upstream direction and transmitting the first wireless performance information to the wireless performance measurement device, the downstream direction being a direction from the wireless base station to the first wireless terminal and the second wireless terminal, and the upstream direction being a direction from the first wireless terminal and the second wireless terminal to the wireless base station, the wireless base station and the second wireless terminal including means for collecting second wireless performance information regarding wireless communication in the downstream direction and second wireless performance information regarding wireless communication in the upstream direction and transmitting the second wireless performance information to the wireless performance measurement device, and the wireless performance measurement device including means for obtaining a first comparison result by comparing the first wireless performance information regarding the upstream direction and the downstream direction, obtaining a second comparison result by comparing the second wireless performance information regarding the upstream direction and the downstream direction, comparing the first comparison result and the second comparison result, and determining a location where an abnormality occurred in accordance with a result of the comparison of the first comparison result and the second comparison result, the location being determined from among the wireless base station, the first wireless terminal, the second wireless terminal, and a wireless propagation environment between the wireless base station and the first wireless terminal and between the wireless base station and the second wireless terminal.

2. The wireless performance measurement system according to claim 1, wherein if the first comparison result and the second comparison result indicate a failure at the first wireless terminal and the second wireless terminal, the wireless performance measurement device determines that a failure occurred at a transmitter of the wireless base station, and if the first comparison result and the second comparison result both indicate a failure at the wireless base station, the wireless performance measurement device determines that a failure occurred at a receiver of the wireless base station.

3. The wireless performance measurement system according to claim 1, wherein if the first comparison result and the second comparison result indicate a failure at the first wireless terminal or the second wireless terminal, the wireless performance measurement device determines that a failure occurred at a receiver of the corresponding wireless terminal, and if only either the first comparison result or the second comparison result indicates a failure at the wireless base station, the wireless performance measurement device determines that a failure occurred at a transmitter of the corresponding wireless terminal.

4. The wireless performance measurement system according to claim 1, wherein if a communication abnormality occurs in a case where the first comparison result and the second comparison result indicate that the first wireless terminal and the second wireless terminal are normal and also indicate that the wireless base station is normal, the wireless performance measurement device determines that the abnormality occurred in the wireless propagation environment.

5. The wireless performance measurement system according to claim 1, wherein if the first comparison result indicates a failure at the wireless base station and the second comparison result indicates a failure at the second wireless terminal, or if the first comparison result indicates a failure at the first wireless terminal and the second comparison result indicates a failure at the wireless base station, the wireless performance measurement device obtains a third comparison result of a comparison of third wireless performance information regarding the upstream direction and the downstream direction collected by a third wireless terminal instead of the first wireless terminal or the second wireless terminal, and determines a failure location in accordance with a result of a comparison with the third comparison result.

6. A wireless performance measurement method of a wireless performance measurement device that is to be connected to a wireless base station in a wireless communication system in which the wireless base station performs wireless communication with two or more wireless terminals including a first wireless terminal and a second wireless terminal, the wireless performance measurement method comprising: a first step of the wireless base station and the first wireless terminal collecting first wireless performance information regarding wireless communication in a downstream direction and first wireless performance information regarding wireless communication in an upstream direction and transmitting the first wireless performance information to the wireless performance measurement device, the downstream direction being a direction from the wireless base station to the first wireless terminal and the second wireless terminal, and the upstream direction being a direction from the first wireless terminal and the second wireless terminal to the wireless base station; a second step of the wireless base station and the second wireless terminal collecting second wireless performance information regarding wireless communication in the downstream direction and second wireless performance information regarding wireless communication in the upstream direction and transmitting the second wireless performance information to the wireless performance measurement device; and a third step of the wireless performance measurement device obtaining a first comparison result by comparing the first wireless performance information regarding the upstream direction and the downstream direction, obtaining a second comparison result by comparing the second wireless performance information regarding the upstream direction and the downstream direction, comparing the first comparison result and the second comparison result, and determining a location where an abnormality occurred in accordance with a result of the comparison of the first comparison result and the second comparison result, the location being determined from among the wireless base station, the first wireless terminal, the second wireless terminal, and a wireless propagation environment between the wireless base station and the first wireless terminal and between the wireless base station and the second wireless terminal.

7. A wireless performance measurement device that is to be connected to a wireless base station in a wireless communication system in which the wireless base station performs wireless communication with two or more wireless terminals including a first wireless terminal and a second wireless terminal, the wireless performance measurement device comprising: means for receiving first wireless performance information regarding wireless communication in a downstream direction and first wireless performance information regarding wireless communication in an upstream direction, the first wireless performance information being collected by the wireless base station and the first wireless terminal, the downstream direction being a direction from the wireless base station to the first wireless terminal and the second wireless terminal, and the upstream direction being a direction from the first wireless terminal and the second wireless terminal to the wireless base station; means for receiving second wireless performance information regarding wireless communication in the downstream direction and second wireless performance information regarding wireless communication in the upstream direction, the second wireless performance information being collected by the wireless base station and the second wireless terminal; and means for obtaining a first comparison result by comparing the first wireless performance information regarding the upstream direction and the downstream direction, obtaining a second comparison result by comparing the second wireless performance information regarding the upstream direction and the downstream direction, comparing the first comparison result and the second comparison result, and determining a location where an abnormality occurred in accordance with a result of the comparison of the first comparison result and the second comparison result, the location being determined from among the wireless base station, the first wireless terminal, the second wireless terminal, and a wireless propagation environment between the wireless base station and the first wireless terminal and between the wireless base station and the second wireless terminal.

8. A non-transitory computer-readable medium having computer-executable instructions that, upon execution of the instructions by a processor of a computer, cause the computer to function as the wireless performance measurement device according to claim 7 and determine the location where the abnormality occurred.

* * * * *